United States Patent [19]

Marshall

[11] 4,100,408
[45] Jul. 11, 1978

[54] SIGNAL GENERATOR FOR RASTER TYPE SCANNERS

[75] Inventor: Sidney W. Marshall, Webster, N.Y.

[73] Assignee: Xerox Corporation, Stamford, Conn.

[21] Appl. No.: 773,445

[22] Filed: Mar. 2, 1977

[51] Int. Cl.² .............................................. G01D 5/30
[52] U.S. Cl. ................................ 250/230; 250/237 G; 356/170
[58] Field of Search ........................... 355/8; 350/6, 7; 250/216, 234, 235, 236, 237 G, 231 SE, 230; 356/169, 170

[56] References Cited
U.S. PATENT DOCUMENTS

| 2,886,718 | 5/1959 | Shepherd et al. | 250/237 G |
| 3,096,441 | 7/1963 | Burkhardt | 250/237 G |
| 3,867,035 | 2/1975 | Kaul | 356/169 |

Primary Examiner—David C. Nelms

[57] ABSTRACT

A signal generating apparatus driven by the reference beam of an image scanning system is disclosed. The apparatus includes an apertured codeplate across which the reference beam sweeps, light from the beam triggering a photodetector to produce a signal pulse output. A grating is inserted into the beam path to split the reference beam into a plurality of spaced apart beams effective to offset blockage or irregularity of one or more of the codeplate apertures.

6 Claims, 3 Drawing Figures

SIGNAL GENERATOR FOR RASTER TYPE SCANNERS

This invention relates to a signal generator for image scanning systems, and more particularly to an improved light beam driven generator for such systems.

Image scanning systems utilize a moving beam of light to scan the image to be reproduced. In systems of this type, operation of the various components that make up the system must be closely synchronized. In one method for effecting such synchronization, a reference beam is split off of the main scanning beam. The reference beam is then directed via an apertured codeplate onto a light detector so that as the reference beam traverses across the codeplate, the detector responds to the pulses of light produced to generate a pulse-like signal usable to synchronize operation of the apparatus components.

However, in the aforedescribed arrangement, dirt and other impurities often present in the operating environment may clog or block some of the apertures in the codeplate. In other cases the apertures may be slightly irregular or displaced. In instances such as these, a distorted and erroneous signal pulse is generated which can have adverse consequences on scanning system timing.

It is a principal object of the present invention to provide a new and improved signal generator for scanning apparatus.

It is a further object of the present invention to provide an improved light beam driven signal generating apparatus.

It is an object of the present invention to provide an improved light beam responsive signal pulse generating system wherein the effects of dirt and other imperfections on the system are minimized.

It is an object of the present invention to provide a signal pulse generator driven by a beam sweeping an apertured member having reduced sensitivity to the effects of impurities and dirt on the member.

This invention relates to a signal generating apparatus for generating signal pulses in accordance with the sweep of a light beam including aperture means, having a succession of spaced apart apertures astride the path through which the light beam sweeps serving on sweep of the light beam thereacross to produce a series of light bursts, and light triggered signal generating means for producing signal pulses in response to the light bursts, the improvement comprising: beam splitting means for separating the light beam into plural secondary light beams, the spacing between the secondary beams being equal to the distance between adjoining ones of the apertures in the aperture means, the plural secondary light beams assuring distortion free production of the signal pulses in the event one or more of the apertures in the aperture means are closed or misaligned.

Other objects and advantages of the present invention will be apparent from the ensuing description and drawings in which.

Figure 1:
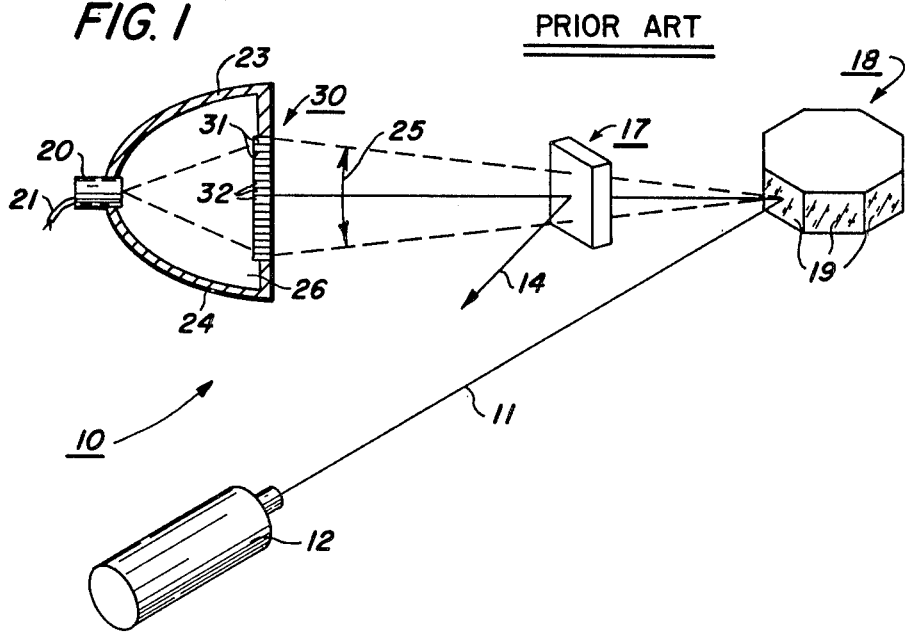
FIG. 1 is a view illustrating a prior art light beam position sensing apparatus of the type used in image scanning systems.

Referring to FIG. 1, a typical beam position sensing apparatus 10 is thereshown such as used in a scanning system. There a scanning light beam 11, which is generated by a suitable narrow bandwidth light source 12, such as a laser, is directed against a rotating polygon scanner 18, scanner 18 having a plurality of reflective facets 19. Beam 11 is reflected from the facets 19 of scanner 18 through a stationary beam splitter 17 which serves to separate beam 11 into main and reference light beams 14, 15 respectively. Main beam 14 is directed by suitable means (not shown) to the item being scanned such as an original document (not shown).

A typical scanning apparatus of the type referred to is described in U.S. Pat. No. 3,966,319 issued on June 29, 1976 in the name of John M. Lang and incorporated by reference herein.

Reference beam 15 is employed to generate pulse signals to be used to synchronize operation of the various machine components. Reference beam 15, which sweeps through a predetermined arc 25 each time the light beam is reflected off a facet 19 of the rotating polygon scanner 18, is directed onto a suitable light responsive signal generating means, such as photodetector 20. Detector 20, as will appear, serves to generate a pulse-like signal in output lead 21 thereof each time light beam 15 is interrupted. A pair of converging reflective surfaces 23, 24, which cooperate to form a channel leading to photodetector 20, are provided. The entrance or mouth 26 formed by reflective surfaces 23, 24 has a dimension at least equal to and preferably somewhat larger than the arc 26 through which beam 15 sweeps.

An apertured codeplate 30, which comprises a series of equally spaced apart light blocking elements 31 and openings 32, is conveniently disposed across the mouth 26 formed by reflective surfaces 23, 24.

In operation, as polygon scanner 18 rotates, reference beam 15 repeatedly sweeps across the face of codeplate 30. As a result, photodetector 20 is exposed to a succession of light pulses or bursts to produce a pulse-like signal in output lead 21 thereof.

Prior art arrangements of the type described often exhibit extreme sensitivity to contaminants such as dirt, or imperfections, which may block or displace one or more of the openings 32 in codeplate 30. When this occurs, the sequence of light bursts reaching photodetector 20 is interrupted or changed resulting in inaccurate or distored signal outputs from photodetector 20.

To obviate this possibility, reference beam 15 is split into plural beams which are applied to codeplate 30. By applying multiple reference beams 15 to codeplate 30, the effect of blocking or distortion of portions of codeplate 30 on the signal pulses generated by photodetector 20 is negated.

Figure 2:
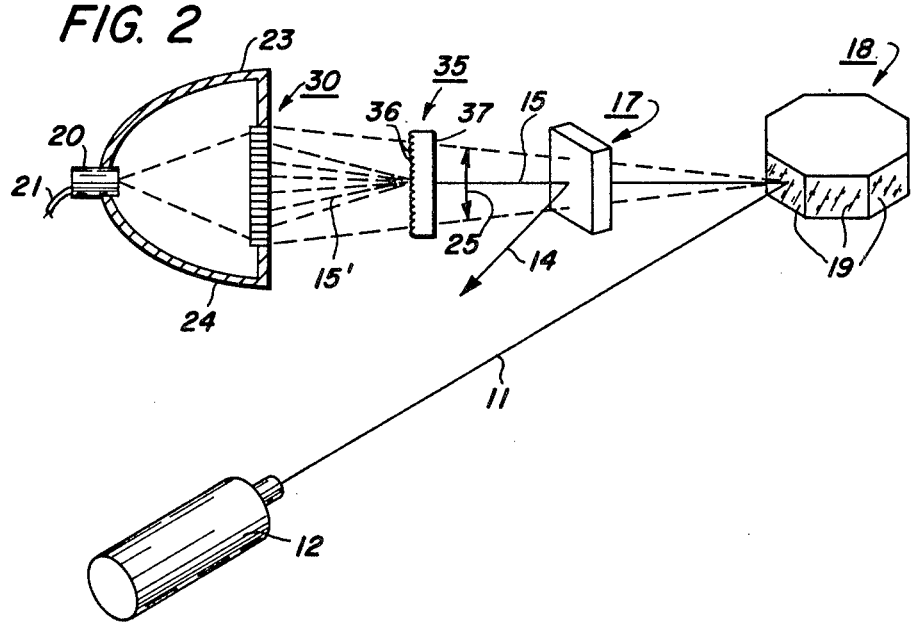
FIG. 2 is a view illustrating the light beam position sensing apparatus of the present invention.
Figure 3:
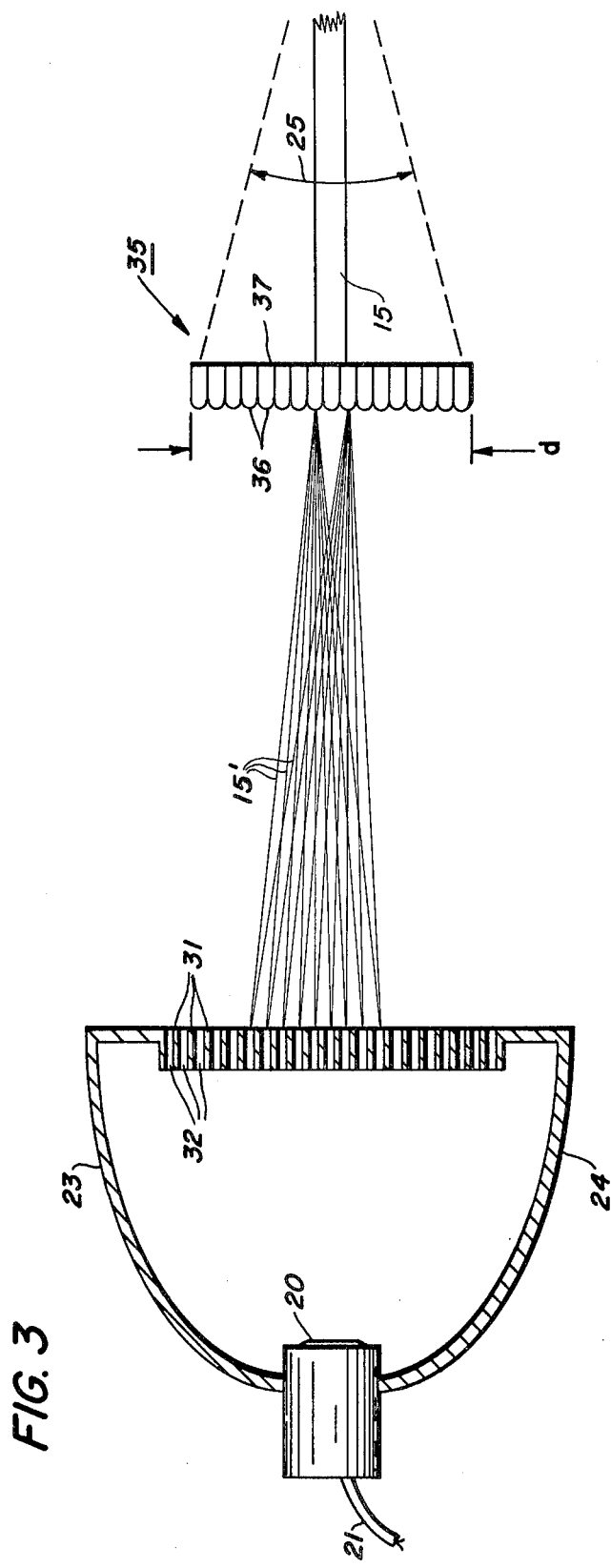
FIG. 3 is an enlarged view showing details of the beam splitting grating and the spatial relationship thereof with the pulse generating mechanism.

Referring to FIGS. 2 and 3 of the drawings, an amplitude optical grating such as a phase grating 35 is disposed in the path of reference beam 15. In the embodiment show, grating 35 comprises a lens element with a succession of relatively narrow equally spaced cylindrical lenses 36. The dimension d of grating 35 is at least equal to the arc 25 through which reference beam 15 sweeps. Grating 35 serves to break reference beam 15 up into a plurality of light beams 15' which strike codeplate 30 at multiple points along the operating extent thereof. By properly sizing and locating grating 35 relative to codeplate 30, the spacing between reference beams 15' at the point where beams 15' strike codeplate 30 is made substantially equal to the spacing between light openings 32 in codeplate 30.

It is understood that it may be necessary to increase the operating length of codeplate 30 to accommodate the increased dimension in the size of arc 25 due to the increase in the number of reference beams 15' generated by grating 35. Further that phase grating 35 may be reversed from the position shown with the cylindrical lens side facing polygon scanner 18.

In operation of the FIGS. 2 and 3 arrangement, the subdivision of reference beam 15 into plural beams 15' provides a plurality of spaced light sources which scan across the face of codeplate 30 simultaneously. As described before, the moving beams 15' are interrupted by blocking elements 31 of codeplate 30 to input a series of light bursts to photodetector 20 to produce a pulse-like signal in output lead 21. Should one or more of the openings 32 in codeplate 30 be distorted or become blocked, the synchronizing signal output of photodetector 20 is unimpaired.

While grating 35 is illustrated as being between polygon scanner 18 and codeplate 30, it will be understood that grating 35 may be disposed between light source 12 and scanner 18. Similarly, beam splitter 17 may be disposed between light source 12 and scanner 18.

While the invention has been described with reference to the structure disclosed, it is not confined to the details set forth, but is intended to cover such modifications or changes as may come within the scope of the following claims.

What is claimed is:

1. In a signal generating apparatus for generating signal pulses in accordance with the sweep of a light beam, the apparatus including aperture means having a succession of spaced apart apertures, the aperture means being astride the path through which the light beam sweeps whereby to produce a succession of light bursts on sweep of the light beam thereacross, and light triggered signal generating means for producing signal pulses in response to the light bursts, the improvement comprising: beam splitting means for separating said light beam into plural secondary light beams, the spacing between said secondary beams being at least equal to the distance between adjoining ones of the apertures in said aperture means, said plural secondary light beams assuring distortion free production of the signal pulses in the event one or more of the apertures in said aperture means are closed or misaligned.

2. The apparatus according to claim 1 including collecting means arranged between said aperture means and said signal generating means for focusing said light bursts onto said signal generating means.

3. The apparatus according to claim 1 in which said signal generating means includes at least one photocell.

4. The apparatus according to claim 1 in which said beam splitting means comprises an amplitude optical grating.

5. The apparatus according to claim 1 in which said beam splitting means comprises a phase grating.

6. The apparatus according to claim 5 in which said phase grating comprises a plurality of equally spaced cylindrical lenses.

* * * * *